US012720394B2

(12) United States Patent
Yang et al.

(10) Patent No.: US 12,720,394 B2
(45) Date of Patent: Aug. 25, 2026

(54) INTER-RADIO ACCESS NETWORK MOBILITY ENHANCEMENTS FOR REDUCED CAPABILITY USER EQUIPMENT

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 301 days.

(21) Appl. No.: 18/631,865

(22) Filed: Apr. 10, 2024

(65) Prior Publication Data

US 2025/0324336 A1 Oct. 16, 2025

(51) Int. Cl.
*H04W 36/14* (2009.01)
*H04W 36/00* (2009.01)

(52) U.S. Cl.
CPC ..... *H04W 36/14* (2013.01); *H04W 36/00698* (2023.05); *H04W 36/0077* (2013.01)

(58) Field of Classification Search
CPC ............. H04W 36/00; H04W 36/0009; H04W 36/0011; H04W 36/0027; H04W 36/0069; H04W 36/00698; H04W 36/0077; H04W 36/03; H04W 36/14; H04W 48/04; H04W 48/12; H04W 48/18
USPC ........... 455/436, 456.5, 456.6, 464; 370/328, 370/329, 331; 375/259, 260
See application file for complete search history.

(56) References Cited

U.S. PATENT DOCUMENTS

| | | | | |
|---|---|---|---|---|
| 2014/0295847 | A1* | 10/2014 | Futaki | H04W 36/0058 455/436 |
| 2017/0188276 | A1* | 6/2017 | Melin | H04W 36/00835 |
| 2020/0336979 | A1* | 10/2020 | Aoyagi | H04L 65/1059 |
| 2022/0248256 | A1* | 8/2022 | Lee | H04W 28/0268 |
| 2022/0279619 | A1* | 9/2022 | Wu | H04W 76/27 |
| 2024/0267847 | A1* | 8/2024 | Esswie | H04W 52/0206 |

* cited by examiner

*Primary Examiner* — Young T. Tse
(74) *Attorney, Agent, or Firm* — Holland & Hart LLP

(57) ABSTRACT

Methods, systems, and devices for wireless communications are described. A user equipment (UE) may receive a system information block one message via a first radio access network (RAN) that indicates a return allowance state for the UE that identifies whether the UE is allowed to reconnect to the first RAN from a second RAN. The UE may perform a mobility procedure from the first RAN to the second RAN, wherein the first RAN supports a set of services that are not supported by the second RAN. The UE may perform a reconnection procedure from the second RAN to the first RAN when both the second RAN and the first RAN are available to the UE, wherein the reconnection procedure is based at least in part on the return allowance state or a return allowance time window that the UE is allowed to reconnect to the first RAN.

20 Claims, 10 Drawing Sheets

200

INTER-RADIO ACCESS NETWORK MOBILITY ENHANCEMENTS FOR REDUCED CAPABILITY USER EQUIPMENT

FIELD OF TECHNOLOGY

The following relates to wireless communications, including inter-radio access network mobility enhancements for reduced capability user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support inter-radio access network (RAN) mobility enhancements for reduced capability (RedCap) user equipment (UE). For example, the described techniques provide for a new radio (NR) system information block one (SIB1) message that indicates whether a RedCap UE can return from a non-RedCap supporting network to the NR network that supports RedCap UE functionalities. For example, the UE may receive or otherwise obtain a SIB1 message via a first RAN (e.g., a NR wireless network). The SIB1 message may indicate that the RedCap UE is allowed to access the first RAN and also indicates a return allowance state. The return allowance state generally identifies whether or not the UE is allowed to reconnect to the first RAN from a second RAN (e.g., a non-RedCap supporting wireless network). In some aspects, the return allowance state may be based on an operation mode of the UE. The UE may perform a mobility procedure from the first RAN to the second RAN (e.g., a non-RedCap supporting RAN). That is, the first RAN (e.g., the RedCap supporting RAN) may support a set of services (e.g., RedCap related services) that are not supported by the second RAN. The UE may perform a reconnection procedure from the second RAN to the first RAN when both RANs are available to the UE. That is, the reconnection procedure may be based on the indication of the return allowance state that the UE is allowed to reconnect to the first RAN. That is, the SIB1 message via the NR network indicating the return allowance state may be used by the UE to override, for example, a system information block twenty-four (SIB24) message identifying the long-term evolution (LTE) network as the preferred network upon connection.

A method for wireless communications by a UE is described. The method may include receiving a SIB1 message via a first RAN that indicates a return allowance state for the UE that identifies whether the UE is allowed to reconnect to the first RAN from a second RAN, where the return allowance state is based on an operation mode of the UE, performing a mobility procedure from the first RAN to the second RAN, where the first RAN supports a set of services that are not supported by the second RAN, and performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

A UE for wireless communications is described. The UE may include one or more memories storing processor executable code, and one or more processors coupled with the one or more memories. The one or more processors may individually or collectively be operable to execute the code to cause the UE to receive a SIB1 message via a first RAN that indicates a return allowance state for the UE that identifies whether the UE is allowed to reconnect to the first RAN from a second RAN, where the return allowance state is based on an operation mode of the UE, perform a mobility procedure from the first RAN to the second RAN, where the first RAN supports a set of services that are not supported by the second RAN, and perform a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

Another UE for wireless communications is described. The UE may include means for receiving a SIB1 message via a first RAN that indicates a return allowance state for the UE that identifies whether the UE is allowed to reconnect to the first RAN from a second RAN, where the return allowance state is based on an operation mode of the UE, means for performing a mobility procedure from the first RAN to the second RAN, where the first RAN supports a set of services that are not supported by the second RAN, and means for performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

A non-transitory computer-readable medium storing code for wireless communications is described. The code may include instructions executable by one or more processors to receive a SIB1 message via a first RAN that indicates a return allowance state for the UE that identifies whether the UE is allowed to reconnect to the first RAN from a second RAN, where the return allowance state is based on an operation mode of the UE, perform a mobility procedure from the first RAN to the second RAN, where the first RAN supports a set of services that are not supported by the second RAN, and perform a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

In some examples of the method, user equipment (UEs), and non-transitory computer-readable medium described herein, the system information block (SIB)1 message further indicates timing parameters associated with the return allowance state.

In some examples of the method, user equipment (UEs), and non-transitory computer-readable medium described herein, and the method, apparatuses, and non-transitory computer-readable medium may include further operations, features, means, or instructions for performing a search procedure to determine an availability of the first RAN according to the search periodicity and performing the reconnection procedure to the first RAN based on a result of the search procedure.

In some examples of the method, user equipment (UEs), and non-transitory computer-readable medium described herein, the search periodicity includes different durations based on a network type of the second RAN.

In some examples of the method, user equipment (UEs), and non-transitory computer-readable medium described herein, and the method, apparatuses, and non-transitory computer-readable medium may include further operations, features, means, or instructions for performing one or more search procedures to determine an availability of the first RAN during the search window and reconnecting to the first RAN based on at least one of the one or more search procedures being successful within the search window.

In some examples of the method, user equipment (UEs), and non-transitory computer-readable medium described herein, the search window includes different durations based on a network type of the second RAN.

In some examples of the method, user equipment (UEs), and non-transitory computer-readable medium described herein, and the method, apparatuses, and non-transitory computer-readable medium may include further operations, features, means, or instructions for performing one or more search procedures to determine an availability of the first RAN during the search window and maintaining a connection to the second RAN based on none of the one or more search procedures being successful within the search window.

In some examples of the method, user equipment (UEs), and non-transitory computer-readable medium described herein, the search window includes different durations based on a network type of the second RAN.

Some examples of the method, user equipment (UEs), and non-transitory computer-readable medium described herein may further include operations, features, means, or instructions for performing the reconnection procedure may be based on the operation mode of the UE while connected to the second RAN.

Some examples of the method, user equipment (UEs), and non-transitory computer-readable medium described herein may further include operations, features, means, or instructions for performing the reconnection procedure to the first RAN based on the operation mode including an idle mode on the second RAN.

Some examples of the method, user equipment (UEs), and non-transitory computer-readable medium described herein may further include operations, features, means, or instructions for performing the reconnection procedure to the first RAN based on the operation mode including an inactive mode on the second RAN.

In some examples of the method, user equipment (UEs), and non-transitory computer-readable medium described herein, the UE includes a reduced capability (RedCap) UE.

In some examples of the method, user equipment (UEs), and non-transitory computer-readable medium described herein, a network type of the first RAN includes a RedCap supporting network type and the network type of the second RAN includes a non-RedCap supporting network type.

In some examples of the method, user equipment (UEs), and non-transitory computer-readable medium described herein, the non-RedCap supporting network type includes one or more of a LTE network, a new radio (NR) network that does not support RedCap operations, or an enhanced RedCap (eRedCap) network.

In some examples of the method, user equipment (UEs), and non-transitory computer-readable medium described herein, the first RAN and the second RAN may be associated with a different radio access technology (RAT), with a different frequency range of a same RAT, or with different cells of a same frequency range or the same RAT.

DETAILED DESCRIPTION

Different wireless network types may support different user equipment (UE) capabilities or services. For example, some wireless network types may support a reduced capability (RedCap) UE while other networks may not support such RedCap UE services. For example, a new radio (NR) wireless network may support a RedCap UE while a long-term evolution (LTE) wireless network may not support such UE services. However, a system information block twenty-four (SIB24) message within the LTE network may identify the LTE network as a high priority network such that the RedCap UE is unable to join a different network type. This may result in a RedCap UE that lost its NR network connection, joining an LTE network, and then being unable to reconnect to the NR network that becomes available for the UE.

Accordingly, aspects of the described techniques provide for a new radio (NR) system information block one (SIB1) message that indicates whether a RedCap UE can return from a non-RedCap supporting network to the NR network that supports RedCap UE functionalities. For example, the UE may receive or otherwise obtain a SIB1 message via a first radio access network (RAN) (e.g., a NR wireless network). The SIB1 message may indicate that the RedCap UE is allowed to access the first RAN and also indicates a return allowance state. The return allowance state generally identifies whether or not the UE is allowed to reconnect to the first RAN from a second RAN (e.g., a non-RedCap supporting wireless network). In some aspects, the return allowance state may be based on an operation mode of the UE. The UE may perform a mobility procedure from the first RAN to the second RAN (e.g., a non-RedCap supporting RAN). That is, the first RAN (e.g., the RedCap supporting RAN) may support a set of services (e.g., RedCap related services) that are not supported by the second RAN. The UE may perform a reconnection procedure from the second RAN to the first RAN when both RANs are available to the UE. That is, the reconnection procedure may be based on the indication of the return allowance state that the UE is allowed to reconnect to the first RAN. That is, the SIB1 message via the NR network indicating the return allowance state may be used by the UE to override, for example, a SIB24 message identifying the LTE network as the preferred network upon connection.

Aspects of the disclosure are initially described in the context of wireless communications systems. Aspects of the disclosure are further illustrated by and described with reference to apparatus diagrams, system diagrams, and flowcharts that relate to inter-RAN mobility enhancements for RedCap UE.

Figure 1:
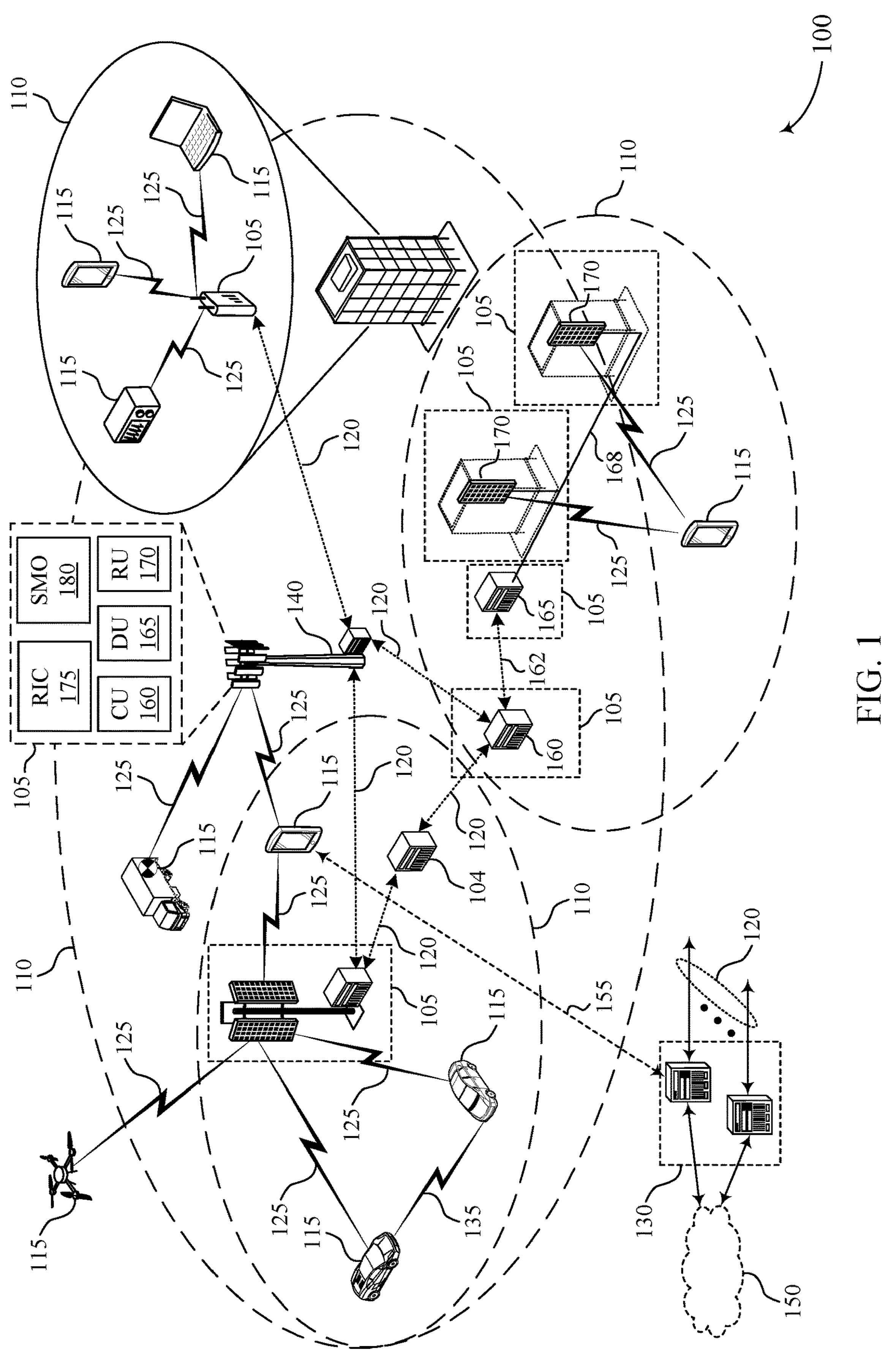
FIG. 1 shows an example of a wireless communications system that supports inter-radio access network (RAN) mobility enhancements for reduced capability (RedCap) user equipment (UE) in accordance with one or more aspects of the present disclosure.

FIG. 1 shows an example of a wireless communications system 100 that supports inter-RAN mobility enhancements for RedCap UE in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104.

That is, an IAB donor may be referred to as a parent node in communication with one or more child nodes (e.g., an IAB donor may relay transmissions for UEs through other IAB node(s) 104). Additionally, or alternatively, IAB node (s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link (s) 125 (e.g., one or more access links) using resources associated with one or more carriers. The term "carrier" may refer to a set of RF spectrum resources having a defined PHY layer structure for supporting the communication link (s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 (e.g., a RedCap UE) may receive a SIB1 message via a first RAN that indicates a return allowance state for the UE that identifies whether the UE is allowed to reconnect to the first RAN from a second RAN, wherein the return allowance state is based on an operation mode of the UE. The UE 115 may perform a mobility procedure from the first RAN to the second RAN, wherein the first RAN supports a set of services that are not supported by the second RAN. The UE 115 may perform a reconnection procedure from the second RAN to the first RAN when both the second RAN and the first RAN are available to the UE, wherein the reconnection procedure is based at least in part on the indication, by the return allowance state or a return allowance time window, that the UE is allowed to reconnect to the first RAN.

Figure 2:
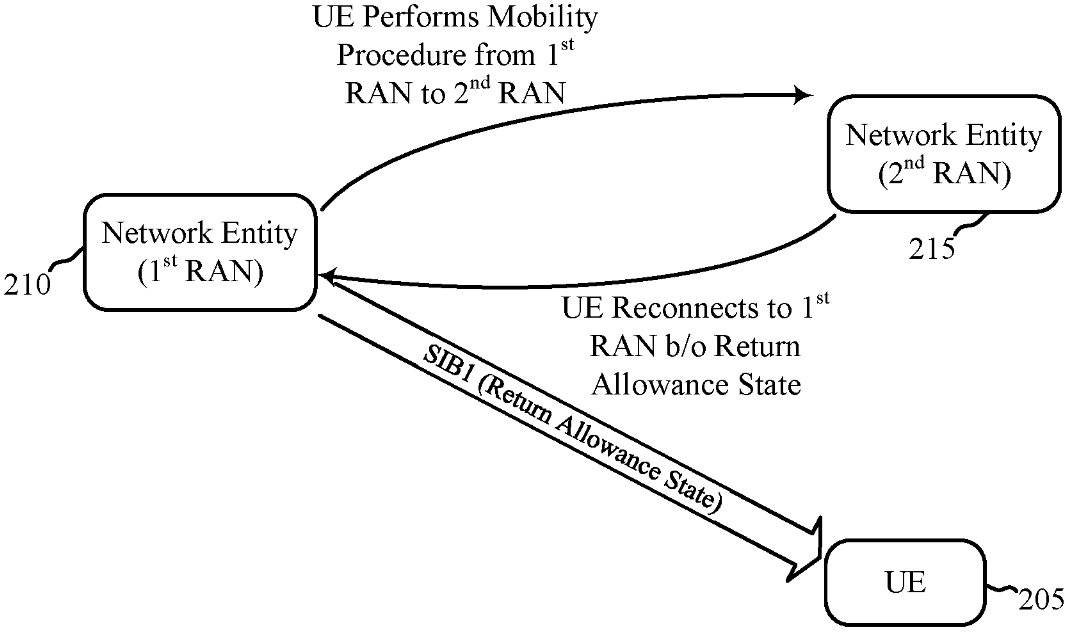
FIG. 2 shows an example of a wireless communications system that supports inter-RAN mobility enhancements for RedCap UE in accordance with one or more aspects of the present disclosure.

FIG. 2 shows an example of a wireless communications system 200 that supports inter-RAN mobility enhancements for RedCap UE in accordance with one or more aspects of the present disclosure. Wireless communications system 200 may implement aspects of wireless communications system 100. Wireless communications system 200 may include a UE 205, a network entity 210, and a network entity 215, which may be examples of the corresponding devices described herein. In some aspects, the network entity 210 may be associated with a first RAN that supports a set of services (e.g., RedCap related services for a RedCap UE) and the network entity 215 may be associated with a second RAN that does not support such services.

In some aspects, the UE 205 may be an example of a RedCap UE. A RedCap UE may generally refer to a UE that supports a subset of functionalities or services as compared to traditional UE. For example, the RedCap UE may include a UE supporting a reduced bandwidth, a reduced complexity level, a reduced downlink or uplink throughput rate, a reduced available power, a reduced number of transmit or receive chains, a reduced peak data rates, or other functionalities or services. RedCap UEs generally provide cost-effective mechanisms to connect devices to a 5G or NR network that do not require the full capabilities or services of the 5G or NR network. Examples of RedCap UEs include, but are not limited to, wearables, industrial sensors, smart meters, or similar devices.

Accordingly, wireless networks continue to implement UE complexity reduction techniques to address issues such as co-existence with non-RedCap UEs, support for the RedCap UE services or functionality, relaxed UE processing timelines, and the like. Such RedCap related services may reuse various non-RedCap services or functionalities, such as SSB reuse, which may include operations within a BWP with or without SSB and with or without RF retuning. Such considerations may be applied within a frequency range (FR) or across different frequency ranges (e.g., FR1 and FR2).

One aspects of RedCap UE services relates to mobility of the RedCap UE. For example, a SIB1 message broadcast within a NR or 5G wireless network (e.g., a first RAN, in this example) may carry or otherwise convey an indication defining RedCap mobility with regards to whether the RedCap UE can camp (e.g., connect) to the first RAN and whether to allow or bar intra-frequency reselection within the first RAN. However, in some scenarios the RedCap UE may fall out of the first RAN coverage (e.g., lose connectivity or lose sufficient connectivity to maintain an active connection) and fall back to a second RAN that does not support such RedCap services (e.g., such as an LTE wireless network). In some aspects, a SIB24 message within the second RAN may carry or otherwise convey an indication that establishes the LTE network as a higher priority network. This may result in the RedCap UE staying on the LTE network even when the RedCap UE returns to the coverage area of the first RAN (e.g., the RedCap-supporting RAN). That is, the RedCap UE cannot access the 5G or NR even when the UE moves back to the NR RedCap coverage area.

Accordingly, aspects of the described techniques provide various mechanisms for a RedCap UE (e.g., the UE 205, in this example) to return to the first RAN (e.g., the wireless network that supports RedCap related services) from the second RAN (e.g., the wireless network that does not support RedCap related services). For example, the UE 205 may receive or otherwise obtain a SIB1 message via the first RAN that indicates a return allowance state for the UE 205 that identifiers whether the UE 205 is allowed to reconnect to the first RAN from a second RAN. This may include adding one or more new information elements (IEs) or fields to indicate whether a RedCap UE is allowed to return to the first RAN. These new IEs or fields may be indicated in the SIB1 message. This technique may avoid changes to the SIB3 or SIB4 messages within the first RAN wireless network.

For example, the UE 205 may initially connect to the network entity 210 for wireless communications. The UE 205 may receive or otherwise obtain the SIB1 message via the network entity 210 while connected to the first RAN. The SIB1 message may indicate whether the RedCap UE can return (e.g., is allowed) for non-RedCap NR networks including after the UE 205 has moved to another RAT (e.g., the second RAN) or NR network that does not support RedCap services or enhanced RedCap (eRedCap) services. This may include whether returning is allowed from an NR network that does not support RedCap services. This may include whether returning is allowed from another RAT. This may include whether returning is allowed for an eRedCap UE from a NR network that does not support eRedCap services.

The UE 205 may perform a mobility procedure form the first RAN (e.g., from the network entity 210) to the second RAN (e.g., to the network entity 215). Broadly, the second RAN in this example may not support a set of services that are supported by the first RAN. For example, the second RAN may be any wireless network that does not support RedCap services or functionality. For example, the second RAN may be an LTE network, or a network that does not support RedCap operations, or an eRedCap network. In some aspects, the mobility procedure may be based on the UE 205 losing connectivity with the first RAN. For example, the channel quality associated with the connection between the UE 205 and the network entity 210 may degrade below a threshold performance level. This may trigger the mobility procedure, which determines that the channel quality associated with the UE 205 and the network entity 215 satisfies the threshold performance requirements.

However, the UE 205 may perform a reconnection procedure from the second RAN (e.g., from the network entity 215) to the first RAN (e.g., to the network entity 210) when both the second RAN and the first RAN are available to the UE 205. That is, the UE 205 may perform various channel monitoring and measurement procedures and, based on a results, determine that the first RAN is again available to establish a connection with. That is, the UE 205 may again return to the coverage area or the channel quality associated with the network entity 210 may again satisfy the channel performance threshold. However, the UE 205 may still be in the coverage area of the second RAN. For example, the channel quality of the wireless link between the UE 205 and the network entity 215 may also satisfy the channel performance threshold. Regardless, the UE 205 may perform the reconnection procedure based on the indication (e.g., as indicated in the return allowance state) that the UE 205 is allowed to reconnect to the first RAN.

As discussed, the SIB1 message may generally carry or otherwise convey an allow or not allowed indication regarding whether the UE 205 is allowed to reconnect to the first RAN (e.g., to the network entity 210) from a second RAN (e.g., from the network entity 215). In some aspects, the SIB1 message may also carry or otherwise convey indication of one or more timing parameters associated with the return allowance state. Generally, the timing parameter(s) may correspond to a timer window for the UE 205 to return to the first RAN (e.g., how often to search for the first RAN and/or the time window during which the returning is allowed). For example, the timing parameter(s) may include a search periodicity associated with the first RAN (e.g., how often to search for the first RAN). In this example, the UE 205 may perform a search procedure to determine an availability of the first RAN according to the search periodicity. In this example, the UE 205 may perform the reconnection procedure to the first RAN based on the results of the search procedure.

In some aspects, different search periodicities may be indicated for different network types associated with the second RAN. That is, different durations of the search periodicity may be established (e.g., implicitly or explicitly indicated in the SIB1 message) for the second RAN based on the network type of the second RAN. For example, when the second RAN is an LTE network a first duration of the search periodicity may be established. However, when the second RAN is a 5G or NR network that does not support RedCap services, a second duration of the search periodicity may be established.

In some examples, the timing parameter(s) may be a search window associated with the first RAN. That is, the timing parameter(s) may indicate the window during which, after the mobility procedure to the second RAN is performed, the UE 205 is allowed to return to the first RAN. For example, the UE 205 may perform one or more search procedure to determine the availability of the first RAN during the search window and reconnect to the first RAN when at least one of the search procedures is successful within the search window. However, the UE 205 may maintain the connection to the second RAN when none of the search procedures are successful during the search window. Moreover, different durations for the search window may be established based on the network type of the second RAN. For example, a first duration of the search window may be established when the second RAN is an LTE network and a second duration of the search window may be established when the second RAN is a 5G or NR network that does not support RedCap services for the UE 205.

In some aspects, the reconnection procedure may be based on the operational mode of the UE 205 while connected to the second RAN. The operational mode may correspond to an active state or mode of the UE 205 versus an idle or inactive state or mode. For example, the UE 205 may be in different RRC states on the second RAN based on whether or not active communications are being performed via the network entity 215. In some examples, the UE 205 may perform the reconnection procedure from the second RAN to the first RAN when the UE 205 is in an idle mode or an inactive mode on the second RAN. However, the UE 205 may maintain the connection to the second RAN when the UE 205 is in an active mode on the network entity 215.

Accordingly, the techniques described herein permit the UE 205 to return to the first RAN (e.g., when both RANs are available to the UE 205) within the timer (e.g., the timing parameter(s)) when the UE 205 is serving or camped on a non-RedCap NR or other RAT, such as an LTE network.

Figure 3:
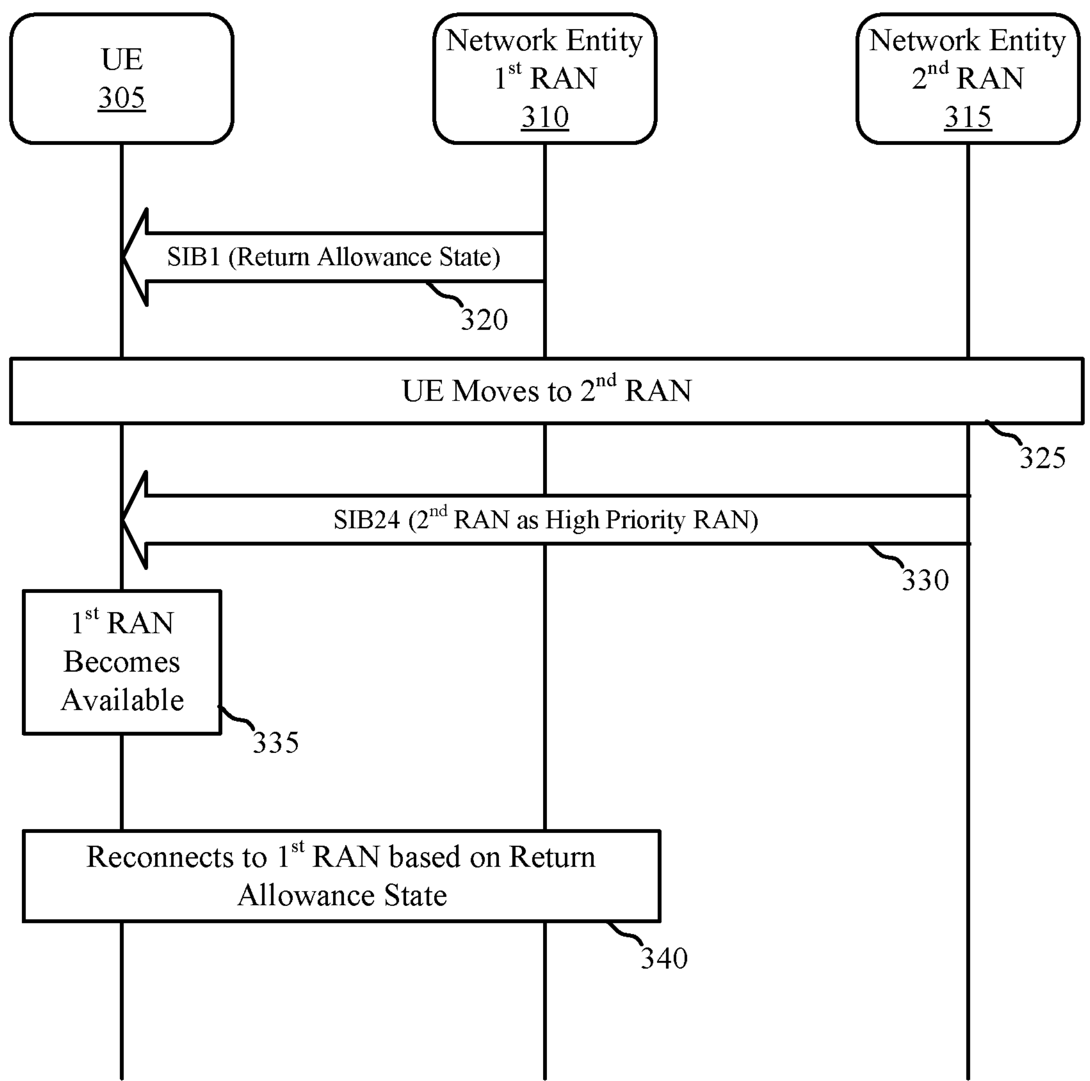
FIG. 3 shows an example of a swim diagram that supports inter-RAN mobility enhancements for RedCap UE in accordance with one or more aspects of the present disclosure.

FIG. 3 shows an example of a swim diagram 300 that supports inter-RAN mobility enhancements for RedCap UE in accordance with one or more aspects of the present disclosure. Swim diagram 300 may implement aspects of wireless communications system 100 or wireless communications system 200. Aspects of swim diagram 300 may be implemented at or implemented by a UE 305, a network entity 310, or a network entity 315, which may be examples of the corresponding devices described herein. In some aspects, the network entity 310 may be associated with a first RAN (e.g., a RAN that supports RedCap-related services) and the network entity 315 may be associated with a second RAN (e.g., a RAN that does not support RedCap-related services). In some aspects, the UE 305 may be an example of a RedCap UE.

At 320, the network entity 310 may transmit or otherwise output (and the UE 305 may receive or otherwise obtain) a SIB1 message that indicates a return allowance state of the UE. The return allowance state may generally identify or otherwise determine whether the UE 305 is allowed (or not allowed) to reconnect to the first RAN from a second RAN. In some aspects, the return allowance state may be based on an operation mode of the UE 305 (e.g., such as an RRC state of the UE 305 when connected to the second RAN). For example, the return allowance state may be based on whether the UE 305 is operating in an active state or more on the second RAN or in an idle or inactive state of mode on the second RAN.

In some aspect, the SIB1 may carry or otherwise indicate various timing parameter(s) associated with the first RAN. For example, the timing parameter(s) may include the search periodicity that indicates how often the UE 305 is to search for the first RAN or may include a search window that defines the duration during which the UE 305 is able to reconnect to the first RAN from the second RAN.

At 325, the UE 305 may perform a mobility procedure from the first RAN to the second RAN. As discussed, the first RAN may support a set of services (e.g., RedCap-related services) that are not supported by the second RAN. For example, the channel quality associated with the network entity 310 may fall below a channel performance threshold such that the mobility procedure is triggered. The UE 305 may connect to the network entity 315 based on a measured or otherwise determined channel quality associated with the network entity 315 exceeding or satisfying the channel performance threshold. Accordingly, the UE 305 may connect to the network entity 315 based on the loss of connection with the network entity 310.

At 330, the network entity 315 may transmit or output (and the UE 305 may receive or otherwise obtain) a SIB24 message via the second RAN. In some aspects, the SIB24 message may indicate or otherwise identify the second RAN as a high priority network for the UE 305. In some wireless networks, the indication of the second RAN as a high priority network may prohibit the UE 305 from transitioning to a different RAN even when the different RAN is a more suitable network relative to the first RAN. However, according to the techniques described herein the SIB1 message received via the network entity 310 may provide an override mechanism where the UE 305 can reconnect to the better RAN (e.g., to the first RAN, in this example).

At 335, the UE 305 may identify or otherwise determine that the first RAN is available to the UE 305. For example, the UE 305 may perform carious channel measurements and, based on the results, determine that the channel quality associated with the network entity 310 exceeds or satisfies the channel performance threshold. In some aspects, the second RAN may also be available to the UE 305. For example, the channel quality associated with the network entity 315 may also satisfy the channel performance threshold.

At 340, the UE 305 may perform a reconnection procedure from the second RAN to the first RAN when both the first RAN and the second RAN area available to the UE 305. For example, the reconnection procedure may be based on the indication (e.g., in the return allowance state) that the UE 305 is allowed to reconnect to the first RAN. Of course, when the return allowance state indicates that the UE 305 is not allowed to return to the first RAN, the UE 305 may maintain the connection with the second RAN.

In some aspects, the reconnection procedure may be performed based on the operation mode of the UE 305 on the second RAN. For example, the UE 305 may perform the reconnection procedure when the UE 305 is in an RRC idle or RRC inactive mode or state on the second RAN. The UE 305 may not perform the reconnection procedure when the UE 305 is in an RRC active mode or state on the second RAN and, therefore, maintain the connection to the second RAN.

Figure 4:
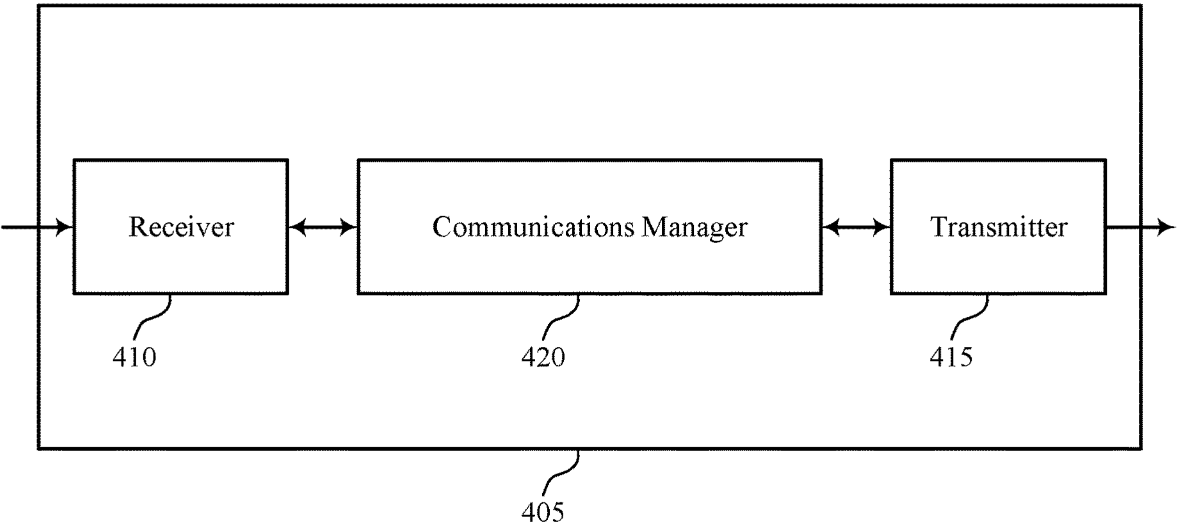
FIGS. 4 and 5 show block diagrams of devices that support inter-RAN mobility enhancements for RedCap UE in accordance with one or more aspects of the present disclosure.

FIG. 4 shows a block diagram 400 of a device 405 that supports inter-RAN mobility enhancements for RedCap UE in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to inter-RAN mobility enhancements for RedCap UE). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to inter-RAN mobility enhancements for RedCap UE). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of inter-RAN mobility enhancements for RedCap UE as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving a SIB1 message via a first RAN that indicates a return allowance state for the UE that identifies whether the UE is allowed to reconnect to the first RAN from a second RAN, where the return allowance state is based on an operation mode of the UE. The communications manager 420 is capable of, configured to, or operable to support a means for performing a mobility procedure from the first RAN to the second RAN, where the first RAN supports a set of services that are not supported by the second RAN. The communications manager 420 is capable of, configured to, or operable to support a means for performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for various techniques for a RedCap UE to reconnect from a second RAN (e.g., a RAN that does not support RedCap-related services) to a first RAN (e.g., a RAN that does support RedCap-related services).

Figure 5:
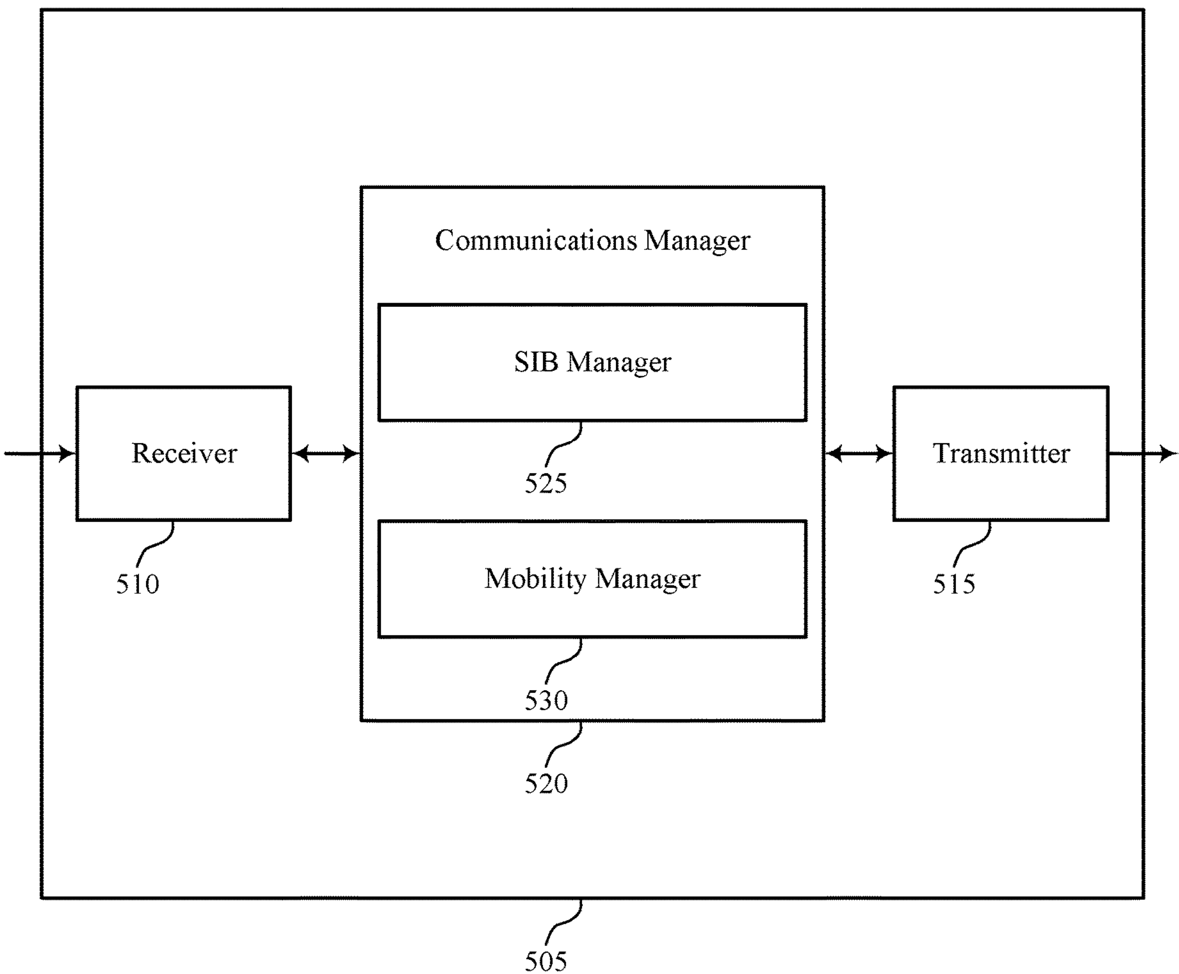

FIG. 5 shows a block diagram 500 of a device 505 that supports inter-RAN mobility enhancements for RedCap UE in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to inter-RAN mobility enhancements for RedCap UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to inter-RAN mobility enhancements for RedCap UE). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of inter-RAN mobility enhancements for RedCap UE as described herein. For example, the communications manager 520 may include an SIB manager 525 a mobility manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The SIB manager 525 is capable of, configured to, or operable to support a means for receiving a SIB1 message via a first RAN that indicates a return allowance state for the UE that identifies whether the UE is allowed to reconnect to the first RAN from a second RAN, where the return allowance state is based on an operation mode of the UE. The mobility manager 530 is capable of, configured to, or operable to support a means for performing a mobility procedure from the first RAN to the second RAN, where the first RAN supports a set of services that are not supported by the second RAN. The mobility manager 530 is capable of, configured to, or operable to support a means for performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

Figure 6:
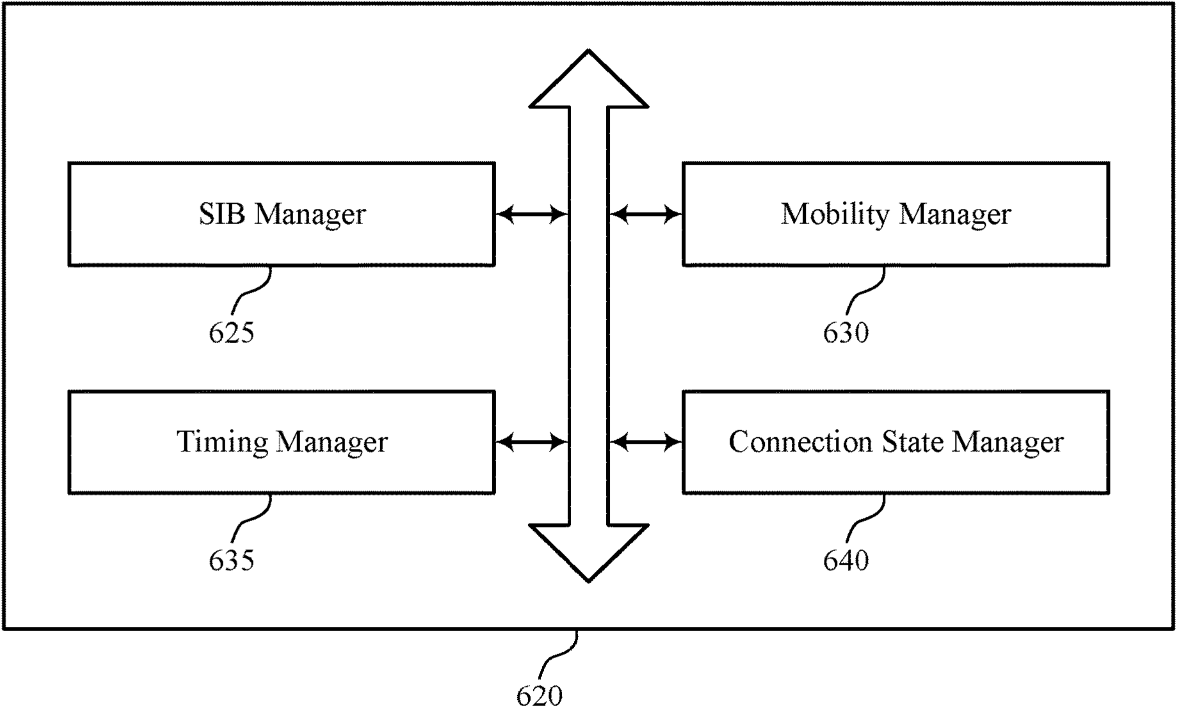
FIG. 6 shows a block diagram of a communications manager that supports inter-RAN mobility enhancements for RedCap UE in accordance with one or more aspects of the present disclosure.
Figure 6:

FIG. 6 shows a block diagram 600 of a communications manager 620 that supports inter-RAN mobility enhancements for RedCap UE in accordance with one or more aspects of the present disclosure. The communications manager 620 may be an example of aspects of a communications manager 420, a communications manager 520, or both, as described herein. The communications manager 620, or various components thereof, may be an example of means for performing various aspects of inter-RAN mobility enhancements for RedCap UE as described herein. For example, the communications manager 620 may include an SIB manager 625, a mobility manager 630, a timing manager 635, a connection state manager 640, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The SIB manager 625 is capable of, configured to, or operable to support a means for receiving a SIB1 message via a first RAN that indicates a return allowance state for the UE that identifies whether the UE is allowed to reconnect to the first RAN from a second RAN, where the return allowance state is based on an operation mode of the UE. The mobility manager 630 is capable of, configured to, or operable to support a means for performing a mobility procedure from the first RAN to the second RAN, where the first RAN supports a set of services that are not supported by the second RAN. In some examples, the mobility manager 630 is capable of, configured to, or operable to support a means for performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

In some examples, the SIB1 message further indicates timing parameters associated with the return allowance state. In some examples, the timing manager 635 is capable of, configured to, or operable to support a means for performing a search procedure to determine an availability of the first RAN according to the search periodicity. In some examples, the timing manager 635 is capable of, configured to, or operable to support a means for performing the reconnection procedure to the first RAN based on a result of the search procedure. In some examples, the search periodicity includes different durations based on a network type of the second RAN.

In some examples, the timing manager 635 is capable of, configured to, or operable to support a means for performing one or more search procedures to determine an availability of the first RAN during the search window. In some examples, the timing manager 635 is capable of, configured to, or operable to support a means for reconnecting to the first RAN based on at least one of the one or more search procedures being successful within the search window. In some examples, the search window includes different durations based on a network type of the second RAN.

In some examples, the timing manager 635 is capable of, configured to, or operable to support a means for performing one or more search procedures to determine an availability of the first RAN during the search window. In some examples, the timing manager 635 is capable of, configured to, or operable to support a means for maintaining a connection to the second RAN based on none of the one or more search procedures being successful within the search window. In some examples, the search window includes different durations based on a network type of the second RAN. In some examples, performing the reconnection procedure is based on the operation mode of the UE while connected to the second RAN.

In some examples, the connection state manager 640 is capable of, configured to, or operable to support a means for performing the reconnection procedure to the first RAN based on the operation mode including an idle mode on the second RAN. In some examples, the connection state manager 640 is capable of, configured to, or operable to support a means for performing the reconnection procedure to the first RAN based on the operation mode including an inactive mode on the second RAN. In some examples, the UE includes a RedCap UE. In some examples, a network type of the first RAN includes a RedCap supporting network type and the network type of the second RAN includes a non-RedCap supporting network type. In some examples, the non-RedCap supporting network type includes one or more of a LTE network, a NR network that does not support RedCap operations, or an eRedCap network. In some examples, the first RAN and the second RAN are associated with a different radio access technology (RAT), with a different frequency range of a same RAT, or with different cells of a same frequency range or the same RAT.

Figure 7:
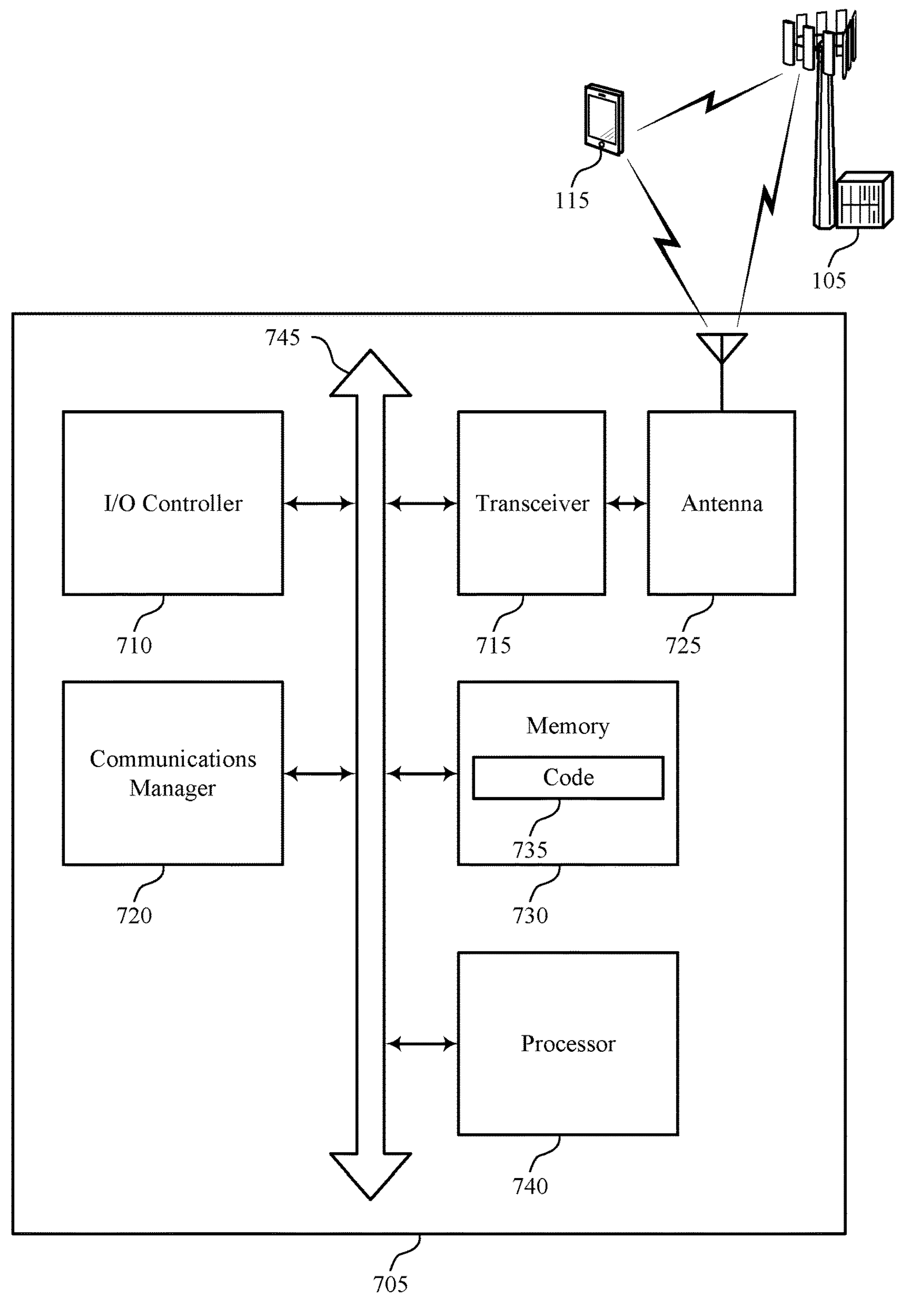
FIG. 7 shows a diagram of a system including a device that supports inter-RAN mobility enhancements for RedCap UE in accordance with one or more aspects of the present disclosure.

FIG. 7 shows a diagram of a system 700 including a device 705 that supports inter-RAN mobility enhancements for RedCap UE in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting inter-RAN mobility enhancements for RedCap UE). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving a SIB1 message via a first RAN that indicates a return allowance state for the UE that identifies whether the UE is allowed to reconnect to the first RAN from a second RAN, where the return allowance state is based on an operation mode of the UE. The communications manager 720 is capable of, configured to, or operable to support a means for performing a mobility procedure from the first RAN to the second RAN, where the first RAN supports a set of services that are not supported by the second RAN. The communications manager 720 is capable of, configured to, or operable to support a means for performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN.

By including or configuring the communications manager 720 in accordance with examples as described herein, the device 705 may support techniques for various techniques for a RedCap UE to reconnect from a second RAN (e.g., a RAN that does not support RedCap-related services) to a first RAN (e.g., a RAN that does support RedCap-related services).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of inter-RAN mobility enhancements for RedCap UE as described herein, or the at least one processor 740 and the at least one memory 730 may be otherwise configured to, individually or collectively, perform or support such operations.

Figure 8:
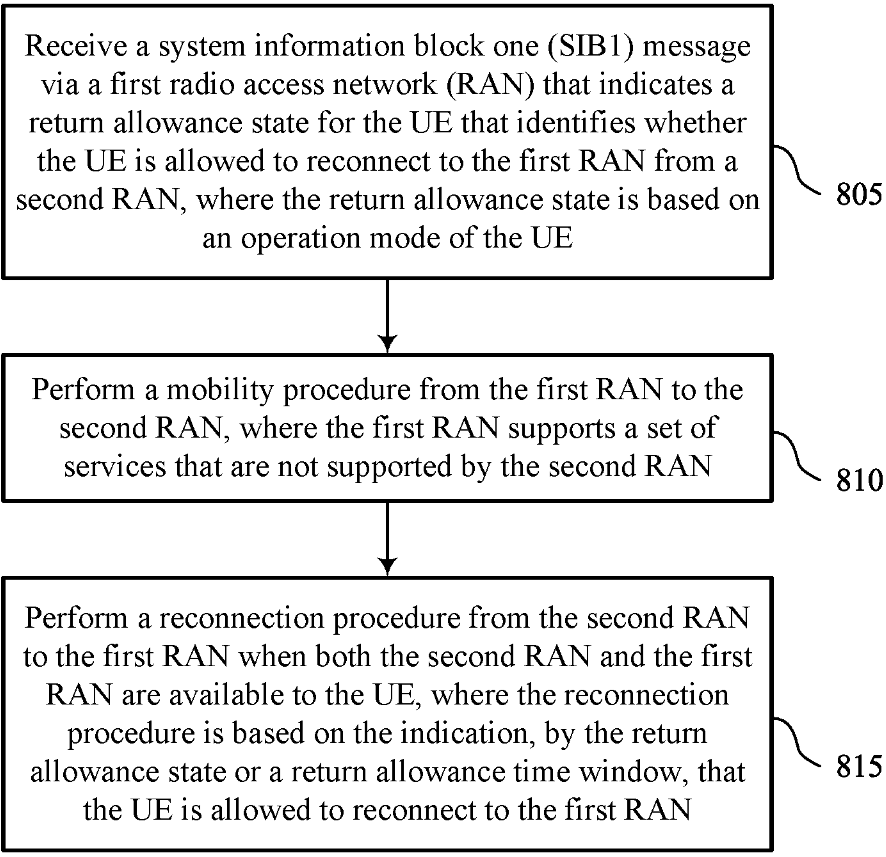
FIGS. 8 through 10 show flowcharts illustrating methods that support inter-RAN mobility enhancements for RedCap UE in accordance with one or more aspects of the present disclosure.

FIG. 8 shows a flowchart illustrating a method 800 that supports inter-RAN mobility enhancements for RedCap UE in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving a SIB1 message via a first RAN that indicates a return allowance state for the UE that identifies whether the UE is allowed to reconnect to the first RAN from a second RAN, where the return allowance state is based on an operation mode of the UE. The operations of 805 may be performed in accordance with examples as disclosed herein. In some examples, aspects of the operations of 805 may be performed by an SIB manager 625 as described with reference to FIG. 6.

At 810, the method may include performing a mobility procedure from the first RAN to the second RAN, where the first RAN supports a set of services that are not supported by the second RAN. The operations of 810 may be performed in accordance with examples as disclosed herein. In some examples, aspects of the operations of 810 may be performed by a mobility manager 630 as described with reference to FIG. 6.

At 815, the method may include performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN. The operations of 815 may be performed in accordance with examples as disclosed herein. In some examples, aspects of the operations of 815 may be performed by a mobility manager 630 as described with reference to FIG. 6.

Figure 9:
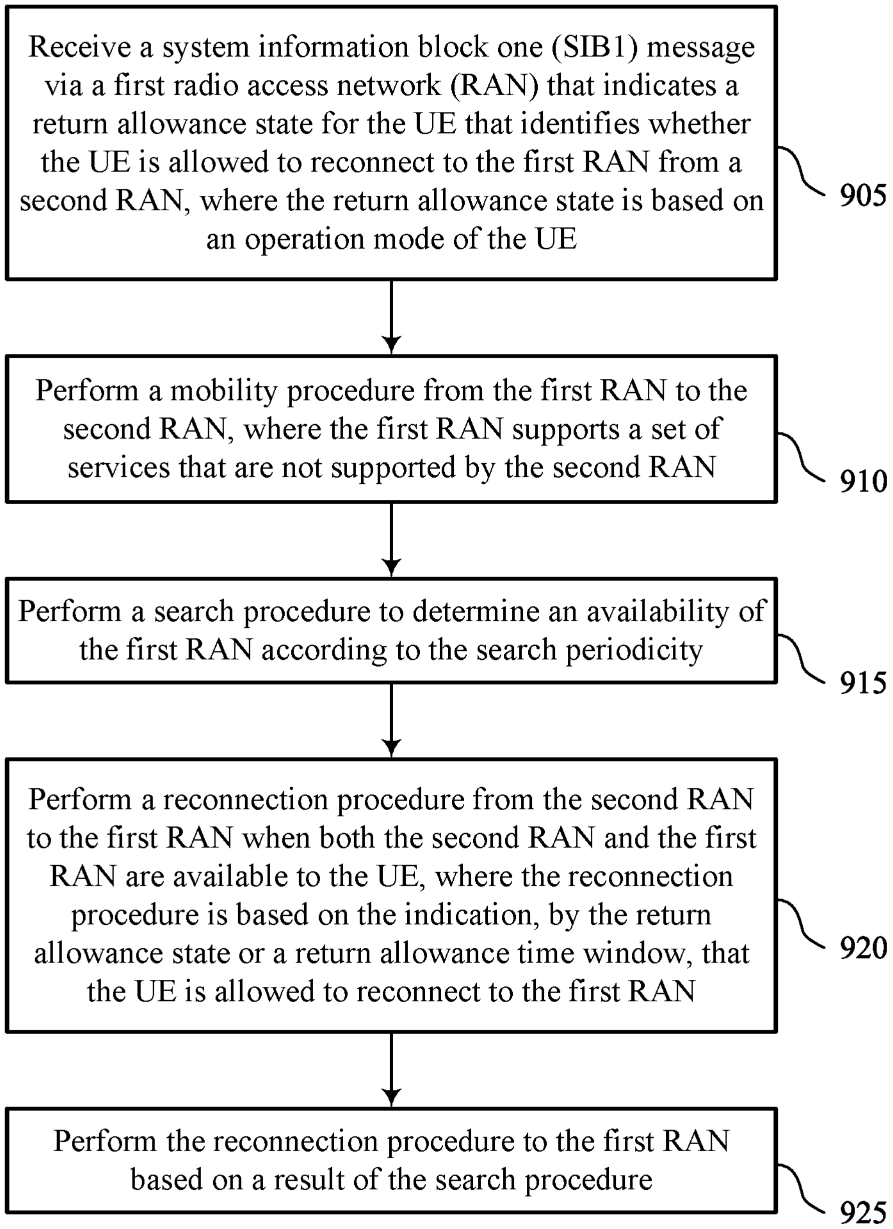

FIG. 9 shows a flowchart illustrating a method 900 that supports inter-RAN mobility enhancements for RedCap UE in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving a SIB1 message via a first RAN that indicates a return allowance state for the UE that identifies whether the UE is allowed to reconnect to the first RAN from a second RAN, where the return allowance state is based on an operation mode of the UE. The operations of 905 may be performed in accordance with examples as disclosed herein. In some examples, aspects of the operations of 905 may be performed by an SIB manager 625 as described with reference to FIG. 6.

At 910, the method may include performing a mobility procedure from the first RAN to the second RAN, where the first RAN supports a set of services that are not supported by the second RAN. The operations of 910 may be performed in accordance with examples as disclosed herein. In some examples, aspects of the operations of 910 may be performed by a mobility manager 630 as described with reference to FIG. 6.

At 915, the method may include performing a search procedure to determine an availability of the first RAN according to the search periodicity. The operations of 915 may be performed in accordance with examples as disclosed herein. In some examples, aspects of the operations of 915 may be performed by a timing manager 635 as described with reference to FIG. 6.

At 920, the method may include performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN. The operations of 920 may be performed in accordance with examples as disclosed herein. In some examples, aspects of the operations of 920 may be performed by a mobility manager 630 as described with reference to FIG. 6.

At 925, the method may include performing the reconnection procedure to the first RAN based on a result of the search procedure. The operations of 925 may be performed in accordance with examples as disclosed herein. In some examples, aspects of the operations of 925 may be performed by a timing manager 635 as described with reference to FIG. 6.

Figure 10:
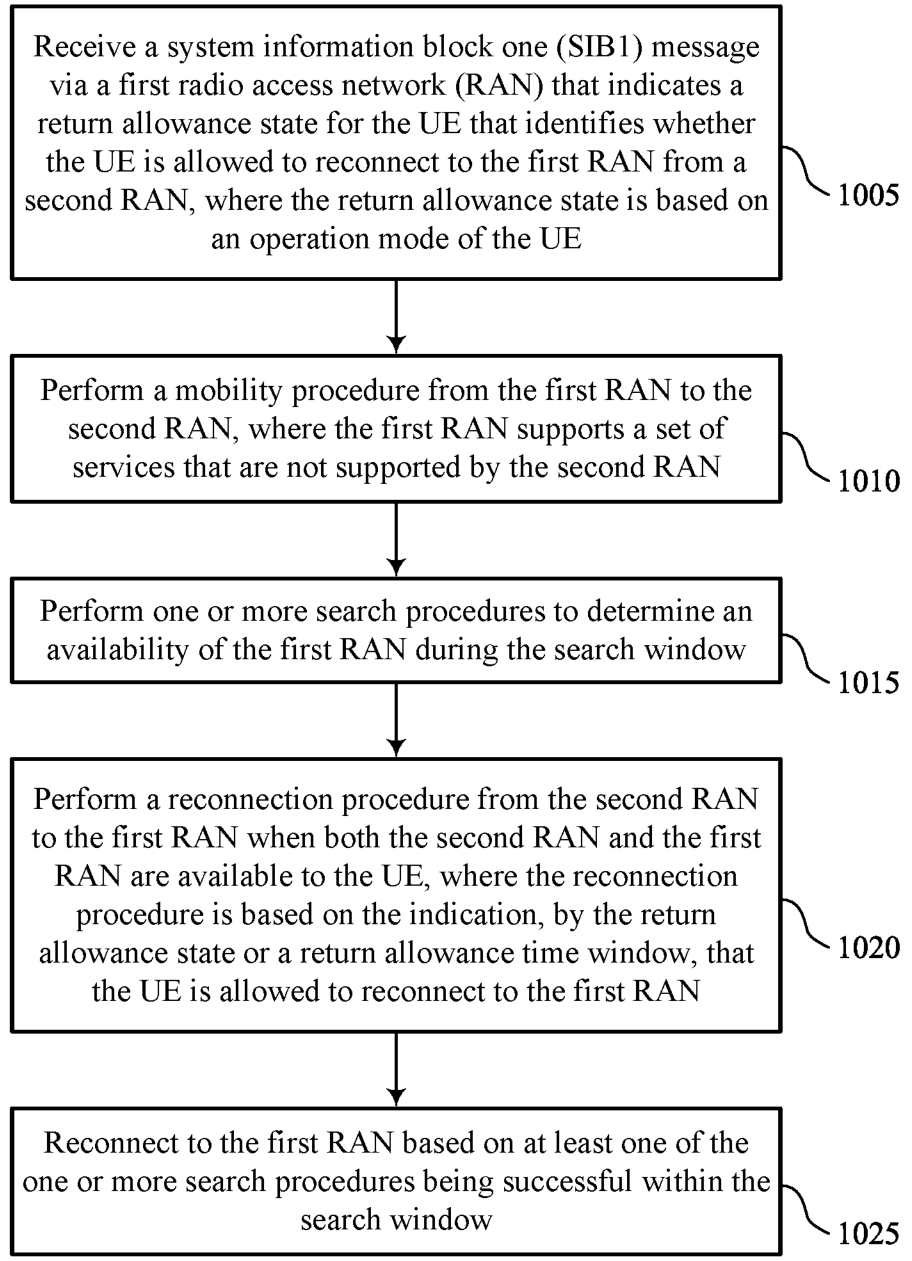

FIG. 10 shows a flowchart illustrating a method 1000 that supports inter-RAN mobility enhancements for RedCap UE in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include receiving a SIB1 message via a first RAN that indicates a return allowance state for the UE that identifies whether the UE is allowed to reconnect to the first RAN from a second RAN, where the return allowance state is based on an operation mode of the UE. The operations of 1005 may be performed in accordance with examples as disclosed herein. In some examples, aspects of the operations of 1005 may be performed by an SIB manager 625 as described with reference to FIG. 6.

At 1010, the method may include performing a mobility procedure from the first RAN to the second RAN, where the first RAN supports a set of services that are not supported by the second RAN. The operations of 1010 may be performed in accordance with examples as disclosed herein. In some examples, aspects of the operations of 1010 may be performed by a mobility manager 630 as described with reference to FIG. 6.

At 1015, the method may include performing one or more search procedures to determine an availability of the first RAN during the search window. The operations of 1015 may be performed in accordance with examples as disclosed herein. In some examples, aspects of the operations of 1015 may be performed by a timing manager 635 as described with reference to FIG. 6.

At 1020, the method may include performing a reconnection procedure from the second RAN to the first RAN when both the second RAN and the first RAN are available to the UE, where the reconnection procedure is based on the indication, by the return allowance state or a return allowance time window, that the UE is allowed to reconnect to the first RAN. The operations of 1020 may be performed in accordance with examples as disclosed herein. In some examples, aspects of the operations of 1020 may be performed by a mobility manager 630 as described with reference to FIG. 6.

At 1025, the method may include reconnecting to the first RAN based on at least one of the one or more search procedures being successful within the search window. The operations of 1025 may be performed in accordance with examples as disclosed herein. In some examples, aspects of the operations of 1025 may be performed by a timing manager 635 as described with reference to FIG. 6.

The following provides an overview of aspects of the present disclosure:

Aspect 1: A method for wireless communications at a UE, comprising: receiving a SIB1 message via a first RAN that indicates a return allowance state for the UE that identifies whether the UE is allowed to reconnect to the first RAN from a second RAN, wherein the return allowance state is based on an operation mode of the UE; performing a mobility procedure from the first RAN to the second RAN, wherein the first RAN supports a set of services that are not supported by the second RAN; and performing a reconnection procedure from the second RAN to the first RAN when both the second RAN and the first RAN are available to the UE, wherein the reconnection procedure is based at least in part on the indication, by the return allowance state or a return allowance time window, that the UE is allowed to reconnect to the first RAN.

Aspect 2: The method of aspect 1, wherein the SIB1 message further indicates timing parameters associated with the return allowance state.

Aspect 3: The method of aspect 2, wherein the timing parameters comprises a search periodicity associated with the first RAN, further comprising: performing a search procedure to determine an availability of the first RAN according to the search periodicity; and performing the reconnection procedure to the first RAN based at least in part on a result of the search procedure.

Aspect 4: The method of aspect 3, wherein the search periodicity comprises different durations based on a network type of the second RAN.

Aspect 5: The method of any of aspects 2 through 4, wherein the timing parameters comprises a search window associated with the first RAN, further comprising: performing one or more search procedures to determine an availability of the first RAN during the search window; and reconnecting to the first RAN based at least in part on at least one of the one or more search procedures being successful within the search window.

Aspect 6: The method of aspect 5, wherein the search window comprises different durations based on a network type of the second RAN.

Aspect 7: The method of any of aspects 2 through 6, wherein the timing parameters comprises a search window associated with the first RAN, further comprising: performing one or more search procedures to determine an availability of the first RAN during the search window; and maintaining a connection to the second RAN based at least in part on none of the one or more search procedures being successful within the search window.

Aspect 8: The method of aspect 7, wherein the search window comprises different durations based on a network type of the second RAN.

Aspect 9: The method of any of aspects 1 through 8, wherein performing the reconnection procedure is based at least in part on the operation mode of the UE while connected to the second RAN.

Aspect 10: The method of aspect 9, further comprising: performing the reconnection procedure to the first RAN based at least in part on the operation mode comprising an idle mode on the second RAN.

Aspect 11: The method of any of aspects 9 through 10, further comprising: performing the reconnection procedure to the first RAN based at least in part on the operation mode comprising an inactive mode on the second RAN.

Aspect 12: The method of any of aspects 1 through 11, wherein the UE comprises a RedCap UE.

Aspect 13: The method of aspect 12, wherein a network type of the first RAN comprises a RedCap supporting network type and the network type of the second RAN comprises a non-RedCap supporting network type.

Aspect 14: The method of aspect 13, wherein the non-RedCap supporting network type comprises one or more of a LTE network, a NR network that does not support RedCap operations, or an eRedCap network.

Aspect 15: The method of any of aspects 1 through 14, wherein the first RAN and the second RAN are associated with a different RAT, with a different frequency range of a same RAT, or with different cells of a same frequency range or the same RAT.

Aspect 16: A UE for wireless communications, comprising one or more memories storing processor-executable code, and one or more processors coupled with the one or more memories and individually or collectively operable to execute the code to cause the UE to perform a method of any of aspects 1 through 15.

Aspect 17: A UE for wireless communications, comprising at least one means for performing a method of any of aspects 1 through 15.

Aspect 18: A non-transitory computer-readable medium storing code for wireless communications, the code comprising instructions executable by one or more processors to perform a method of any of aspects 1 through 15.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a system information block one (SIB1) message via a first radio access network (RAN) that indicates a return allowance state for the UE that identifies whether the UE is allowed to reconnect to the first RAN from a second RAN, wherein the return allowance state is based on an operation mode of the UE;

perform a mobility procedure from the first RAN to the second RAN, wherein the first RAN supports a set of services that are not supported by the second RAN; and perform a reconnection procedure from the second RAN to the first RAN when both the second RAN and the first RAN are available to the UE, wherein the reconnection procedure is based at least in part on the indication, by the return allowance state or a return allowance time window, that the UE is allowed to reconnect to the first RAN.

2. The UE of claim 1, wherein the SIB1 message further indicates timing parameters associated with the return allowance state.

3. The UE of claim 2, wherein the timing parameters comprise a search periodicity associated with the first RAN, the one or more processors are individually or collectively operable to execute the code to cause the UE to:

perform a search procedure to determine an availability of the first RAN according to the search periodicity; and perform the reconnection procedure to the first RAN based at least in part on a result of the search procedure.

4. The UE of claim 3, wherein the search periodicity comprises different durations based on a network type of the second RAN.

5. The UE of claim 2, wherein the timing parameters comprise a search window associated with the first RAN, the one or more processors are individually or collectively operable to execute the code to cause the UE to:

perform one or more search procedures to determine an availability of the first RAN during the search window; and reconnect to the first RAN based at least in part on at least one of the one or more search procedures being successful within the search window.

6. The UE of claim 5, wherein the search window comprises different durations based on a network type of the second RAN.

7. The UE of claim 2, wherein the timing parameters comprise a search window associated with the first RAN, the one or more processors are individually or collectively operable to execute the code to cause the UE to:

perform one or more search procedures to determine an availability of the first RAN during the search window; and maintain a connection to the second RAN based at least in part on none of the one or more search procedures being successful within the search window.

8. The UE of claim 7, wherein the search window comprises different durations based on a network type of the second RAN.

9. The UE of claim 1, wherein performing the reconnection procedure is based at least in part on the operation mode of the UE while connected to the second RAN.

10. The UE of claim 9, wherein the one or more processors are individually or collectively further operable to execute the code to cause the UE to:

perform the reconnection procedure to the first RAN based at least in part on the operation mode comprising an idle mode on the second RAN.

11. The UE of claim 9, wherein the one or more processors are individually or collectively further operable to execute the code to cause the UE to:

perform the reconnection procedure to the first RAN based at least in part on the operation mode comprising an inactive mode on the second RAN.

12. The UE of claim 1, wherein the UE comprises a reduced capability (RedCap) UE.

13. The UE of claim 12, wherein a network type of the first RAN comprises a RedCap supporting network type and a network type of the second RAN comprises a non-RedCap supporting network type.

14. The UE of claim 13, wherein the non-RedCap supporting network type comprises one or more of a long-term evolution (LTE) network, a new radio (NR) network that does not support RedCap operations, or an enhanced RedCap (eRedCap) network.

15. The UE of claim 1, wherein the first RAN and the second RAN are associated with a different radio access technology (RAT), with a different frequency range of a same RAT, or with different cells of a same frequency range or the same RAT.

16. A method for wireless communications at a user equipment (UE), comprising:

receiving a system information block one (SIB1) message via a first radio access network (RAN) that indicates a return allowance state for the UE that identifies whether the UE is allowed to reconnect to the first RAN from a second RAN, wherein the return allowance state is based on an operation mode of the UE;

performing a mobility procedure from the first RAN to the second RAN, wherein the first RAN supports a set of services that are not supported by the second RAN; and performing a reconnection procedure from the second RAN to the first RAN when both the second RAN and the first RAN are available to the UE, wherein the reconnection procedure is based at least in part on the indication, by the return allowance state or a return allowance time window, that the UE is allowed to reconnect to the first RAN.

17. The method of claim 16, wherein the SIB1 message further indicates timing parameters associated with the return allowance state.

18. The method of claim 17, wherein the timing parameters comprise a search periodicity associated with the first RAN, further comprising:

performing a search procedure to determine an availability of the first RAN according to the search periodicity; and performing the reconnection procedure to the first RAN based at least in part on a result of the search procedure.

19. The method of claim 18, wherein the search periodicity comprises different durations based on a network type of the second RAN.

20. A non-transitory computer-readable medium storing code for wireless communications, the code comprising instructions executable by one or more processors to:

receive a system information block one (SIB1) message via a first radio access network (RAN) that indicates a return allowance state for a user equipment (UE) that identifies whether the UE is allowed to reconnect to the first RAN from a second RAN, wherein the return allowance state is based on an operation mode of the UE;

perform a mobility procedure from the first RAN to the second RAN, wherein the first RAN supports a set of services that are not supported by the second RAN; and perform a reconnection procedure from the second RAN to the first RAN when both the second RAN and the first RAN are available to the UE, wherein the reconnection procedure is based at least in part on the indication, by the return allowance state or a return allowance time window, that the UE is allowed to reconnect to the first RAN.

* * * * *